Dec. 1, 1942.  H. G. W. YOUNG  2,303,595
DEVICE FOR CUTTING EDIBLES
Filed Feb. 7, 1941   5 Sheets-Sheet 1
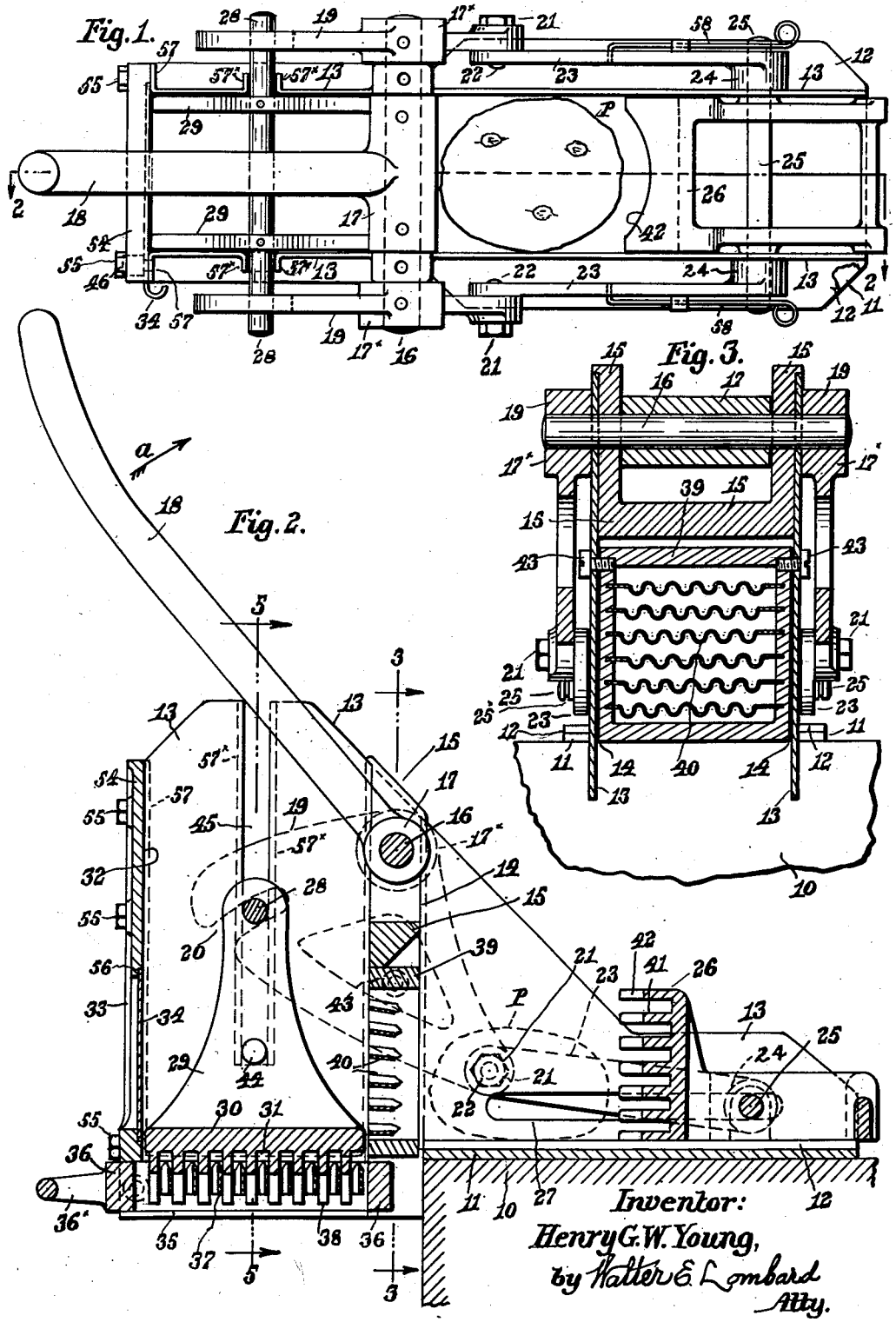
Inventor:
Henry G. W. Young,
by Walter E. Lombard
Atty.

Dec. 1, 1942.    H. G. W. YOUNG    2,303,595
DEVICE FOR CUTTING EDIBLES
Filed Feb. 7, 1941    5 Sheets-Sheet 2

Inventor:
Henry G. W. Young,
by Walter E. Lombard,
Atty.

Dec. 1, 1942.  H. G. W. YOUNG  2,303,595
DEVICE FOR CUTTING EDIBLES
Filed Feb. 7, 1941  5 Sheets-Sheet 3

Inventor:
Henry G. W. Young,
by Walter E. Lombard,
Atty.

Dec. 1, 1942. H. G. W. YOUNG 2,303,595
DEVICE FOR CUTTING EDIBLES
Filed Feb. 7, 1941  5 Sheets-Sheet 4

Inventor:
Henry G. W. Young,
by Walter E. Lombard,
Atty.

Dec. 1, 1942.  H. G. W. YOUNG  2,303,595
DEVICE FOR CUTTING EDIBLES
Filed Feb. 7, 1941   5 Sheets—Sheet 5
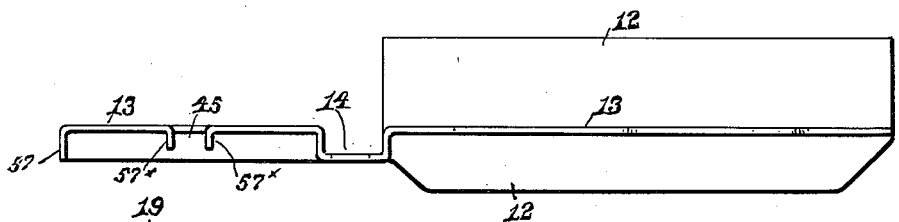
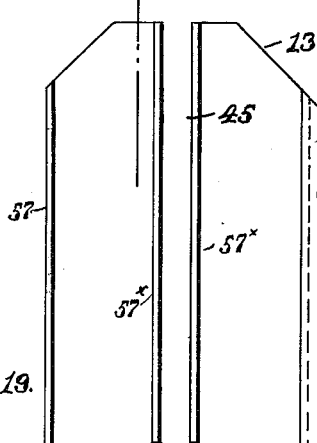
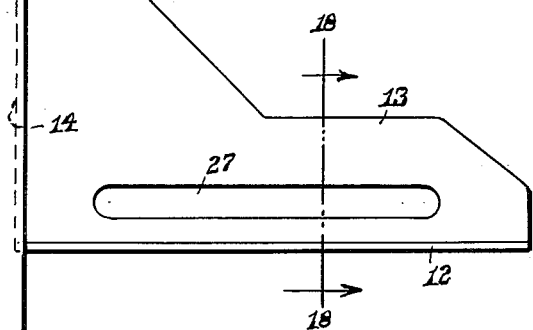
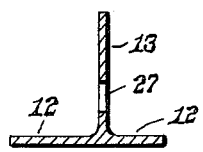
Inventor:
Henry G. W. Young,
by Walter E. Lombard,
Atty.

Patented Dec. 1, 1942

2,303,595

UNITED STATES PATENT OFFICE 2,303,595

DEVICE FOR CUTTING EDIBLES

Henry G. W. Young, Somerville, Mass.

Application February 7, 1941, Serial No. 377,799

21 Claims. (Cl. 146—78)

This invention relates to devices for cutting edibles and has for its object the provision of a machine of this character which is adapted to cut vegetables, fruit, meat and other foods into slices, cubes, strips, or into very small parts, to be used in salads, soups, or sandwiches.

One of the main objects of the invention is to provide a machine of this character which may be used to cut a potato into slices for German fries, into elongated sections to be used for French fries, or to form an elongated section for frying having its four sides corrugated.

A further object of the invention is the provision of means for cutting meat, cabbages and other vegetables into very small parts for making salads and sandwiches, and cole slaw in the case of cabbages.

Another object of the invention is the construction of a machine of this character in which a variety of knives in different shapes and separated at different distances are mounted in rectangular frames any one or more of which may be mounted in the machine to perform various cutting operations.

A further object of the invention is the provision whereby vegetables or other food material may be cut into cubes.

A still further object of the invention is the production of a machine of this character which may be constructed at a minimum cost.

The invention consists of a bed plate having mounted thereon the various instrumentalities which are to be used to perform the various kinds of cutting operations.

The objects of the invention are attained by the instrumentalities shown in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents a plan of a cutting machine embodying the principles of the present invention.

Figure 2 represents a section of the same on line 2, 2 on Fig. 1.

Figure 3 represents a vertical transverse section of the same on line 3, 3 on Fig. 2.

Figure 15 represents an elevation of a portion of a knife to be hereinafter referred to.

Figure 16 represents a plan of one of the stamped side plates of the machine.

Figure 17 represents an elevation of the same.

Figure 18 represents a section of same on line 18, 18 of Fig. 17, and

Figure 19 represents a section of same on line 19, 19 on Fig. 17.

Similar characters indicate like parts throughout the several figures of the drawings.

Figure 5:
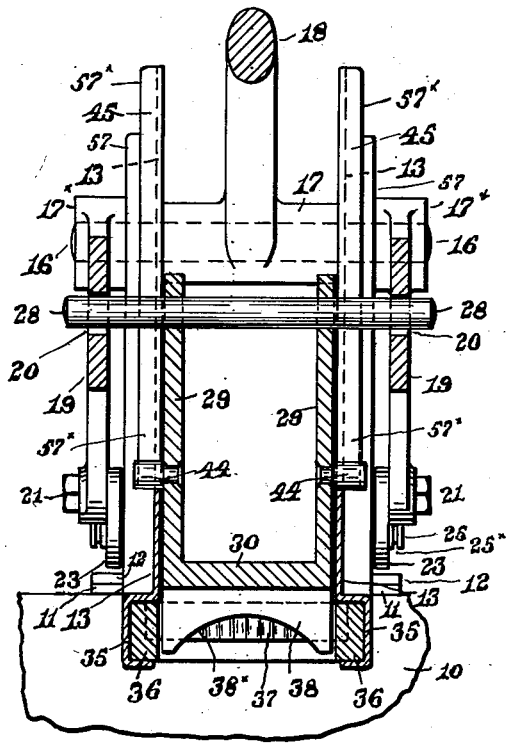
Figure 5 represents a transverse vertical section on line 5, 5 on Fig. 2.
Figure 4:
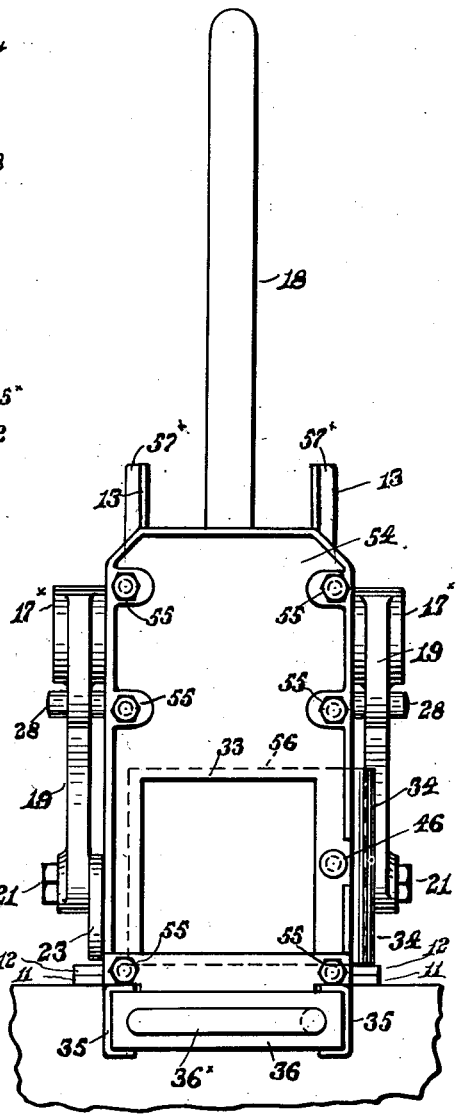
Figure 4 represents a front elevation of the machine.
Figure 6:
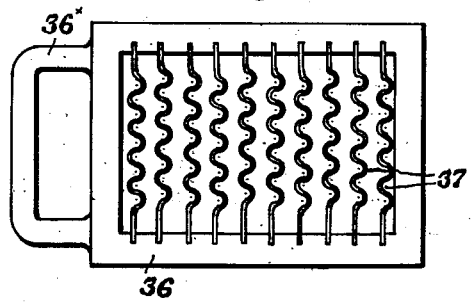
Figure 6 represents a plan of a frame containing a plurality of knives to be used at the bottom of the main chamber, as indicated in section in Fig. 2 of the drawings.
Figure 7:
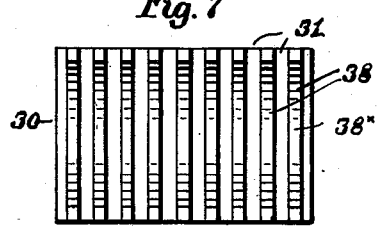
Figure 7 represents an inverted plan of slotted plunger to cooperate with the knives shown in Fig. 6 of the drawings.

In the drawings, 10 is a portion of a table or bench on which is placed a base plate 11 of steel which is of equal thickness throughout and may or may not be secured to said table.

To the top of this base plate 11 is spot welded a pair of pressed steel members 12 having upwardly extending side plates 13.

These plates 13 each have at 14 a vertical U-shaped depression in the upper end of which is disposed an inverted U-shaped strengthening member 15 having outwardly extending flanges 15x resting on the top of the plates 13.

Extending through the reenforced portions 14 and 15 of these side plates 13 is a shaft 16 having mounted thereon and secured thereto between said side plates 13 the hub 17 of a manually operated lever 18.

Each outer end of the shaft 16 has secured thereto the hub 17x of a plate 19 having a cam slot 20 in its forward end and a threaded pin 21 in its rear end, said pin 21 having a reduced cylindrical end 22 extending through the front end of a link 23 the rear end of which has a hub 24 through which extends a shaft 25.

This shaft 25 extends through a horizontally movable plunger 26 and the extreme outer ends of this shaft 25 are disposed in the horizontal slots 27 in the plates 13.

Extending through the cam slot 20 is a shaft or pin 28, said shaft extending through upwardly extending ears 29 in a plunger 30, the under face of which has a plurality of parallel grooves 31 formed therein.

It is obvious that by moving the handle 18 in the direction of the arrow a on Fig. 2 of the drawings, the plunger 30 will be raised in the bottomless chamber 32 and at the same time the plunger 26 will be moved horizontally toward said chamber 32.

The front wall of the chamber 32 has an opening 33 therein normally closed by a slidable plate 34.

The chamber 32 is in front of the front edge of the table or bench 10.

Beneath the chamber 32 are two parallel grooves 35 formed in the lower ends of the plates 13, these grooves extending rearwardly.

In the grooves 35 is adapted to be disposed a removable frame 36 having extending transversely thereof a plurality of corrugated knives 37, between which the parallel projection 38 formed by the grooves 31 of plunger 30 are adapted to be disposed when the plunger 30 is in its lowest position.

The lower ends of the projections 38 are slightly concaved endwise thereof as indicated at 38x in Fig. 5 of the drawings.

In the rear wall of the chamber 32 is adapted to be disposed in the lower ends of the depressions 14 a frame 39 having a plurality of corrugated knives 40 therein, these knives 40 being perpendicular to the knives 37 in the frame 36.

At the rear of the frame 39 is the plunger 26 having formed in its front face a plurality of parallel projections 41, the forward edges of which have concavities therein, as indicated at 42 in Fig. 1 of the drawings.

When the plunger 26 is moved forwardly toward the chamber 32 the projections 41 will enter the spaces between the knives 40 of the frame 39.

In the operation of the machine a potato P is placed between the side walls 13 and in front of the plunger 26.

When this has been done the operator moves the handle 18 in the direction of the arrow a and causes the plunger 30 to be raised in the chamber 32 and at the same time the plunger 26 will be moved forward to force the potato into the chamber 32 between the knives 40 causing the potato to be divided into pieces having corrugated upper and lower faces.

These divided pieces of potato are forced by the plunger 26 under the plunger 30 and when the plunger 30 is moved downwardly by the movement of the handle 18 in the opposite direction to the arrow a the pieces of potato will be divided along corrugated lines and form a plurality of corrugated edibles which may be dropped from the knives 37 into any suitable receptacle beneath the open lower end of the chamber 32.

The frame 36 is provided with a handle 36x by which said frame may be inserted into or removed from the grooves 35.

Below the U-shaped member 15 and in the grooves 14 of the side plates 13, the frame 39 may be inserted from the lower end thereof until its upper end comes into contact with the lower end of the U-shaped member 15. In this position it is locked by means of one or more screws 43.

The outer ends of the shaft 28 extend through the ears 29 of plunger 30, and these outer ends and the studs 44 secured to said plunger 30 are adapted to travel in vertical slots 45 formed in the side plates 13.

When the slidable plate 34 is in its closed position it is locked in said closed position by means of the screw 46.

The knives 40 in the frame 39 are inclined and slightly out of parallelism with each other, as indicated in Fig. 3 of the drawings.

When it is desired to slice other vegetables, fruit and meat for use in salads, for pickling, or making sandwiches, the frame 36 may be removed from the grooves 35 and another frame 47 substituted therefor.

Figure 12:
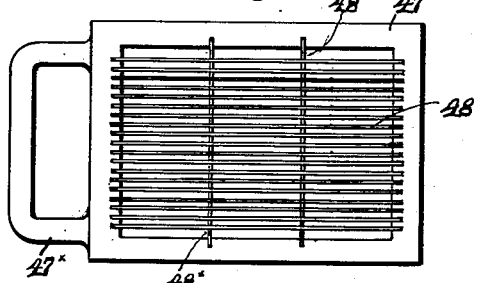
Figure 12 represents a frame with a plurality of knives therein adapted to be disposed in the bottom of said chamber beneath the vertically movable plunger therein.
Figure 13:
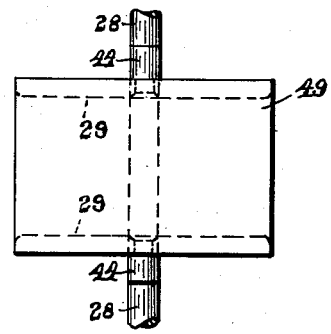
Figure 13 represents an inverted plan of the plunger in the chamber shown in Fig. 11.
Figure 14:
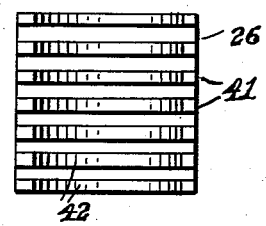
Figure 14 represents a front elevation of the slotted plunger shown in Fig. 1 of the drawings.

This frame 47 has a plurality of knives 48 extending lengthwise thereof and spaced apart by transversely disposed knives 48x, as shown in Fig. 12 of the drawings.

The spacing apart of the knives 48 may be varied to suit different conditions of work to be done.

This frame 47 preferably has a handle 47x by which it may be inserted into the grooves 35 and removed therefrom.

When this frame 47 with its knives 48 is to be used, a plunger 49 may be substituted for the plunger 30 in the chamber 32.

Figure 11:
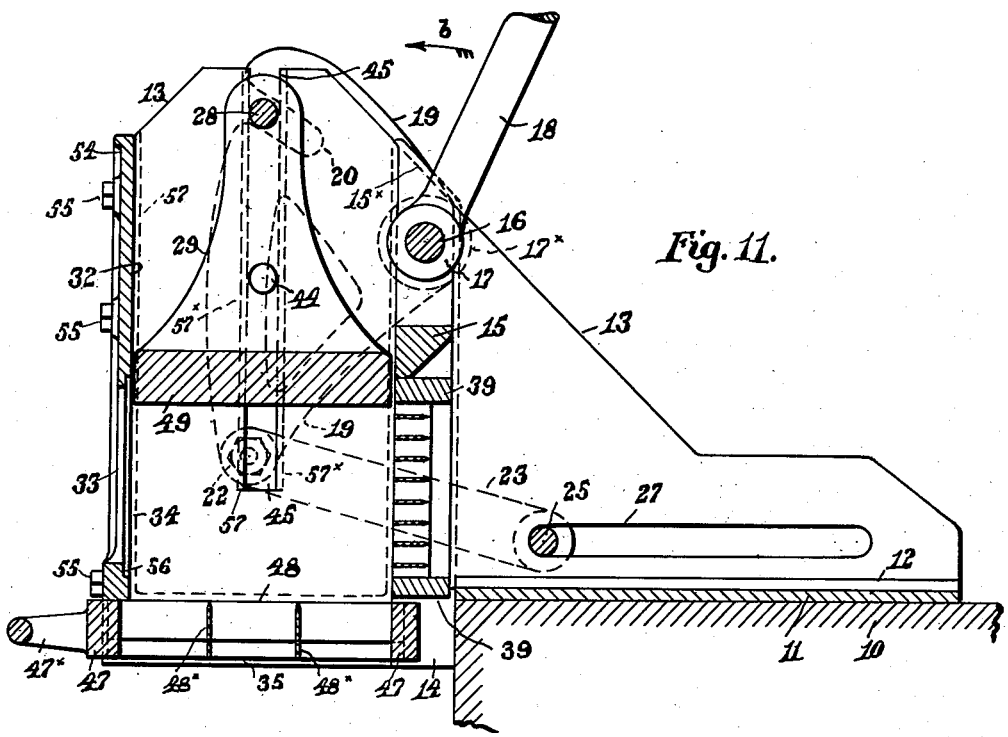
Figure 11 represents a vertical section on line 2, 2 of Fig. 1 showing the machine adapted to cut into slices edibles inserted beneath a vertically movable plunger through an opening in a side of the main chamber of the machine.

The under side of the plunger 49 has a plane unbroken surface, as shown in Fig. 11 of the drawings.

When the plunger 49 is in its upper position the slidable member 34 is removed and then edibles may be inserted into the chamber 32 through the opening 33, these edibles being disposed upon the knives 48 and 48x.

Figure 15:

The knives 48x are provided in the upper end thereof with a plurality of slits 47x as shown in Fig. 15 of the drawings, and the knives 48 are disposed in these slits 47x.

By this construction the knives 48 are prevented from buckling, and consequently are retained in parallelism at all times.

The slits 47x may be spaced apart at different distances according to the particular work to be performed.

The slidable member 34 is then moved into the position to close the opening 33.

The operator then by moving the handle 18 in the direction of the arrow b on Fig. 11 of the drawings, will lower the plunger 49 and force the edibles through the spaces between the knives 48, 48x allowing the sliced portions of said edibles to drop into any suitable receptacle provided to receive them.

Figure 9:
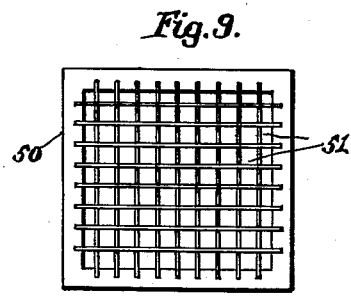
Figure 9 represents a frame containing a plurality of knives such as are to be used in the construction shown in Fig. 8.
Figure 10:
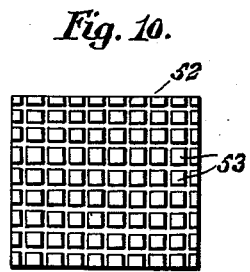
Figure 10 represents an elevation of a slotted plunger adapted to cooperate with the knives shown in Fig. 9.

When it is desired to cut edibles into strips rectangular in cross section, the frame 39 is removed from the grooves 14 and a frame 50 is inserted into the grooves 14, this frame 50 having a plurality of knives 51 spaced apart with one set of knives perpendicular to the other set, as shown in Fig. 9 of the drawings.

When this frame 50 is in use a plunger 52 is used instead of the plunger 26, said plunger 52 having rectangular projections 53 formed in the front face thereof.

When the frame 50 and plunger 52 are in use there is no plunger required in the chamber 32.

Figure 8:
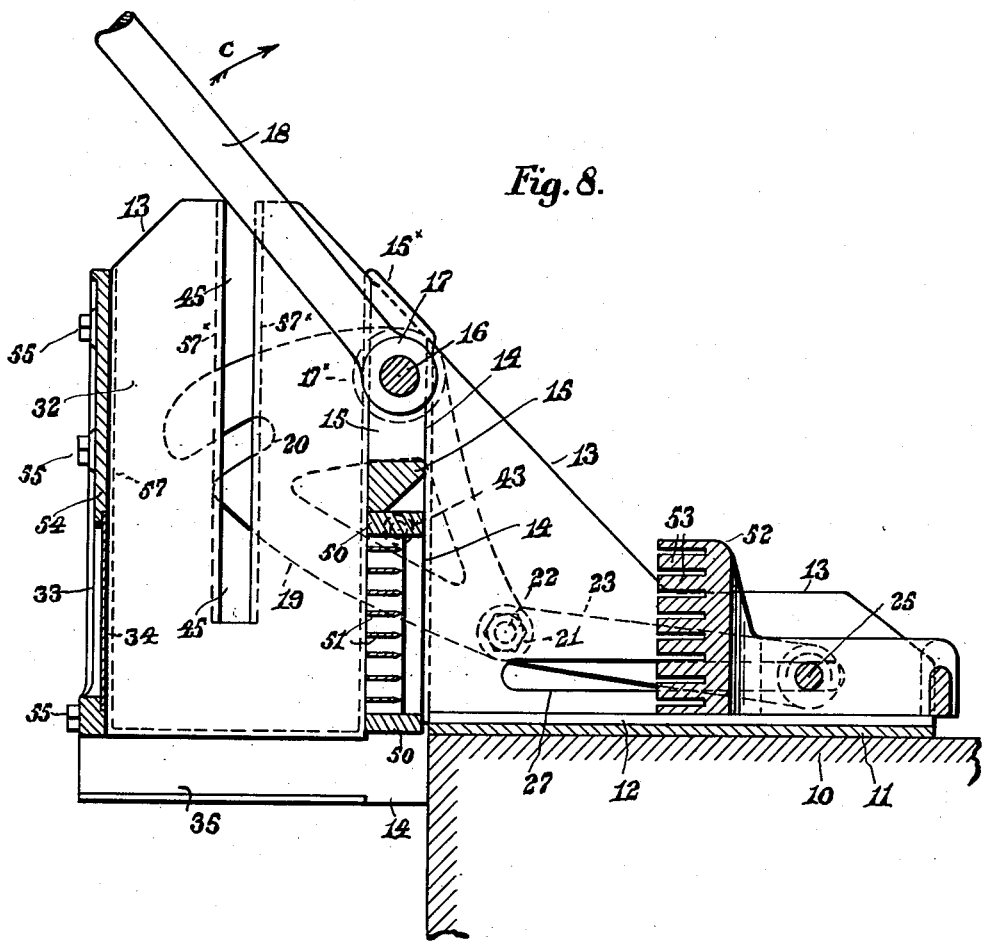
Figure 8 represents a vertical longitudinal section on line 2, 2 of Fig. 1 showing the machine adapted to cut edibles into cubes.

A potato or other edible having been placed between the plunger 52 and frame 50, the lever 18 may be moved in the direction of the arrow c on Fig. 8 of the drawings and the edible will be forced through the openings between the knives 51 causing the same to be cut into elongated sections rectangular in cross section.

These sections thus cut may be dropped through the open bottom of the chamber 32 into any suitable receptacle provided to receive said sections.

The front wall 54 of the chamber 32 is removable but is normally secured to the flanges 57 extending outwardly from the side plates 13 by means of the screws 55 shown in Figs. 1, 2, 4, 8 and 11 of the drawings.

By removing the front wall 54 the chamber 32 may be thoroughly cleaned after one kind of edible has been operated upon before another kind of edible is inserted into said chamber.

The opening 33 is formed in this front wall 54 and the closing plate 34 is disposed in a recess or depression 56 in the inner face thereof. In closing position the inner face of the plate 34 is alined with the inner face of the front wall 54.

On either side of the vertical slot 45 the plate 13 has outwardly extending flanges 57x which stiffen the plate 13.

The outer ends of the shaft 25 have annular peripheral grooves 25x formed therein and normally positioned in said grooves 25x are springs 58 which are secured at one end to the side plates 13.

When it is desired to remove a plunger 26 and substitute therefor another plunger such as 52, these springs 58 may be removed from the peripheral grooves 25x to permit the shaft 25 to be moved endwise and removed from the plunger 26.

When a new plunger as 52 is substituted for the plunger 26, the shaft 25 is positioned therein and then locked from end movement by inserting the springs 58 again in the peripheral slots 25x.

The curvatures 42 on the forward ends of the projections 41 of the plunger 26 and similar curvatures 38x in the lower end of the projections 38 of the plunger 30 in the chamber 32 perform an important office because when these projections push the potato or other vegetable through the knives with which they coact a shearing effect is produced which is very advantageous.

The flanges 57 at the front end of the side members 13 not only stiffen the same but also provide a means whereby the front wall 54 of the machine may be secured thereto by the screws 55.

The flanges 57x not only stiffen the frame but also form a better broad faced guide for the shaft 26 as it is reciprocated in the slot 45.

The making of the framework in the manner shown and described is of some importance, the base plate 11 being preferably made of steel and the base 12 of the side frames 13 being spot welded or otherwise secured thereto.

The adjacent edges of the bases 12 preferably abut as shown at the right of Fig. 1.

These bases 12 and the side frames 13 are made of pressed steel and are provided with the longitudinal slots 27, the vertical U-shaped depressions 14, the flanges 57x forming broad faced walls to a vertical slot 45 and has reenforcing flanges 57 at the forward end of said side plates 13.

By this construction a more rigid framework is secured which is much lighter than a framework formed of cast metal.

Moreover, by forming the framework in the manner shown and described, the cost of manufacture is greatly reduced and a more rigid framework is provided.

By making the knives 40 in the frame 39 slightly out of parallelism with each other, it has been found in practice that it is much easier to force a potato between said knives than would be the case if the knives 40 were parallel to each other.

It is obvious, therefore, this one machine as shown and described may be utilized for cutting various edibles into different shapes according to the manner in which they are to be cooked or served.

All that is necessary is to provide different frames having knives arranged therein in such a manner as to accomplish the purpose desired, it being understood that in some cases only a single horizontal plunger 52 is required without any plunger in the chamber 32, as shown in Fig. 8, and in other cases no horizontally movable plunger is required and the plunger 49 as shown in Fig. 11 is provided which in its downward movement will cooperate with the knives 48 and 48x and accomplish the desired object.

In some other particular work, such as for instance, the formation of corrugated edibles, it is essential that a special form of plunger 30 be provided as shown in Fig. 5, and in this case a special form of plunger 26 must be provided, these plungers 30 and 26 respectively coacting with the special form of knives 37 in frame 36 and the special forms of knives 40 shown in the framework 39.

It is believed that the operation and many advantages of the invention will be understood without further description.

Having thus described my invention, I claim:

1. In a device for cutting edibles, the combination of a frame consisting of a flat bed plate having superimposed upon and secured thereto a pair of independent parallel side plates provided at their lower ends with abutting oppositely disposed flanges, the upper and lower faces of which are parallel, said side plates having horizontal grooves formed in the forward end thereof and near the bottom thereof; a bottomless chamber at said forward end of said frame perpendicular to said bed plate; a plunger movable vertically in said chamber; a single rectangular frame having a plurality of transverse knives and insertable into said horizontal grooves below said chamber; an oscillating shaft the ends of which extend through said side plates; and a manually actuated lever for reciprocating said plunger, the hub of which is disposed upon said shaft between said side plates.

2. In an edible cutter as set forth in claim 2, in which said side plates have at the rear of said chamber oppositely disposed vertical grooves open at the bottom; a second rectangular frame having a plurality of two sets of transverse knives perpendicular to each other and insertable into the lower ends of said vertical grooves; means for locking said second frame in working position; a horizontally movable plunger cooperating with the knives of said second frame and having on its front face a plurality of flat ended rectangular projections adapted to coact with the knives of said second frame.

3. In a device for cutting edibles as set forth in claim 1, in which means is provided for retaining said knife frame in working position with the outer side portions thereof between and in contact with the upper and lower walls of said horizontal grooves.

4. In a device for cutting edibles, as set forth in claim 1, in which said side plates have oppositely disposed vertical grooves open at the bottom and closed at the top thereof; a second rectangular frame having a plurality of transverse knives and insertable into the lower ends of said vertical grooves; means for retaining said second frame in working position; a plunger movable horizontally between said plates; and a lever between said side plates for reciprocating said plunger.

5. In a device for cutting edibles as set forth in claim 1, in which said side plates have at the forward end thereof and at the rear of said chamber oppositely disposed vertical grooves open at the bottom and closed at the top thereof; a second rectangular frame having a plurality of transverse knives and insertable into the lower ends of said vertical grooves; means for retaining said second frame in working position; a plunger cooperating with the knives of said frame, said plunger being slidable horizontally by said lever on the upper face of the opposed inner flanges of said plates.

6. In a device for cutting edibles as set forth in claim 1, in which said side plates have at the rear of said chamber oppositely disposed vertical grooves open at the bottom and closed at the top thereof; a second rectangular frame having a plurality of knives and insertable into the lower ends of said vertical grooves; means for retaining said second frame in working position; a plunger movable horizontally by said lever on the inwardly extending flanges of said side plates and cooperating with the knives of the second frame; cam plates secured to and oscillating with the shaft of said actuating lever; and links connecting said horizontally movable plunger with the lower ends of said cam plates.

7. In a device for cutting edibles as set forth in claim 1, in which said side plates have at the rear of said chamber oppositely disposed vertical grooves open at the bottom and closed at the top thereof; a second rectangular frame having a plurality of transverse knives and insertable into the lower ends of said vertical grooves; means for retaining said second frame in working position; cam plates on the outer ends of said oscillating lever shaft; a horizontally movable plunger cooperating with the knives of said second frame and slidable upon the inwardly extending flanges of said side plates; a plurality of transverse projections on the front of said horizontally movable plunger adapted to coact with the knives of the second frame with their front edges slightly concaved endwise; and links connecting the lower ends of said cam plates to a shaft extending through said movable plunger.

8. In a device for cutting edibles as set forth in claim 1, in which said side plates have at the rear of said chamber oppositely disposed vertical grooves open at the bottom and closed at the top thereof; a second rectangular frame having a plurality of transverse knives and insertable into the lower ends of said vertical grooves; means for supporting said second frame in working position; a horizontally movable plunger cooperating with the knives of said second frame and slidable upon the inwardly extending flanges of said side plates; a plurality of elongated projections on the front end of the horizontally movable plunger and the lower end of the vertical movable plunger; said projections being slightly concaved endwise and adapted to coact respectively with the knives of the second and first knife frames; and means for moving forward the horizontally movable plunger by said actuating lever and then moving downwardly the vertical movable plunger by a reversal of the movement of said lever.

9. In a device for cutting edibles as set forth in claim 1, in which said side plates have at the rear of said chamber oppositely disposed vertical grooves open at the bottom and closed at the top; a second rectangular frame having mounted therein two sets of transverse knives perpendicular to each other and insertable into the lower ends of said vertical grooves; means for retaining said second frame in working position; a horizontally movable plunger cooperating with the knives of the second frame and having on its front face a plurality of flat ended rectangular projections adapted to coact with the knives of the second frame; and means connected to said actuating lever whereby the horizontal plunger is moved at once to the end of its forward stroke and then the vertical plunger is moved downwardly by a reversal of the movement of said lever.

10. In a device for cutting edibles as set forth in claim 1, in which each side plate thereof is formed of metal of equal thickness throughout and is provided near its forward end with a vertical slot with outwardly extending integral flanges at the opposite sides of said slot.

11. In a device for cutting edibles as set forth in claim 1, in which each side plate thereof is formed of metal of equal thickness throughout and has formed integral therewith near its forward end a vertical groove with parallel side walls.

12. In a device for cutting edibles as set forth in claim 1, in which each side plate thereof is formed of metal of equal thickness throughout and has formed integral therewith near its forward end a vertical groove with parallel side walls and said side plate having a cylindrical hole formed therein near the upper end of said groove.

13. In a device for cutting edibles as set forth in claim 1, in which each side plate thereof is formed of metal of equal thickness throughout and has formed integral therewith at the bottom of its forward end a horizontal groove with parallel upper and lower walls.

14. In a device for cutting edibles, a combination of a frame consisting of a bed plate having secured thereto parallel vertical side plates each of said side plates having near the bottom thereof a longitudinal slot; a plunger movable horizontally between said side plates; a rectangular frame having a plurality of transverse knives and insertable into vertical grooves formed in said side plates; an oscillating shaft extending through bearings in said side plates; a manually actuated lever secured to said shaft between said side plates; cam plates secured to the opposite ends of said oscillating shaft; a removable shaft extending through a cylindrical bearing in said plunger with its ends disposed in said longitudinal slots; links between the ends of said shaft and the lower ends of said cam plates; and means for preventing the accidental displacement of said plunger shaft.

15. In a device for cutting edibles as set forth in claim 1, in which a side wall of said chamber has an opening therein through which edibles may be inserted into said chamber onto said knives; and a plate for closing said opening slidable in a depression in said side wall with its inner face in the same plane as the inner face of said wall.

16. In a device for cutting edibles as set forth in claim 1, in which said side plates have at the rear of said chamber oppositely disposed vertical grooves open at the bottom; a second rectangular frame having a plurality of transverse inclined knives out of parallelism with each other and insertable into the lower ends of said vertical grooves; means for locking said second frame in working position; a horizontally movable plunger cooperating with the knives of said second frame and in its movement contacting with the upper faces of the inwardly extending flanges of said side plates; and a plurality of transverse projections on the front of said horizontally movable plunger adapted to coact with the knives of said second frame with their front edges slightly concaved endwise.

17. In a device for cutting edibles as set forth in claim 1, in which said side plates have at the rear of said chamber oppositely disposed vertical grooves open at the bottom; a second rectangular frame having a plurality of transverse knives and insertable into the lower ends of said vertical grooves; means for locking said second frame in working position; a horizontally movable plunger cooperating with the knives of said second frame; and a plurality of transverse projections on the front of said horizontally movable plunger adapted to coact with the knives of said second frame with their front edges slightly concaved endwise, the knives in both knife frames being corrugated with one set of knives perpendicular to the other set of knives.

18. In a device for cutting edibles, the combination of a frame consisting of a bed plate having secured thereto the inwardly extending flanges of a pair of parallel side plates, said plates having oppositely disposed flanged vertical slots formed therein at the forward ends thereof; a bottomless chamber at the forward end of said frame perpendicular to and in front of said bed plate; a plunger movable vertically in said chamber and having a pin extending therethrough into said vertical slots; a rectangular frame having a plurality of transverse knives and insertable in grooves formed in the bottom of said side plates and below said chamber; studs extending from the opposite sides of said plunger into the flanged vertical slots of said side plates; a shaft oscillatable in both of said side plates; a manually actuated lever secured to said shaft between said side plates; and plates secured to said shaft having cam slots coacting with the outer ends of said pin to reciprocate said plunger.

19. In a device for cutting edibles as set forth in claim 1, in which said side plates have at the rear of said chamber oppositely disposed vertical grooves; and a U-shaped reenforcing member secured in the upper end of said grooves and through which the shaft of said actuating lever extends.

20. In a device for cutting edibles, a framework consisting of a metal base plate having secured thereto the abutting inwardly extending flanges of two oppositely disposed side plates each having a horizontally disposed guide slot in the rear end thereof, a vertical side depression opening inwardly, a slot in the forward portion having outwardly extending flanged walls, an outwardly extending reenforcing flange at the front thereof, and a horizontally disposed groove at the bottom of the forward end thereof extending rearwardly to the vertical side depression.

21. In a device for cutting edibles, a framework consisting of a metal base plate having secured thereto the abutting flanges of two oppositely disposed side plates each having a horizontally disposed guide slot in the rear end thereof, a vertical side depression opening inwardly, a vertical slot in the forward portion having outwardly extending flanged walls, an outwardly extending reenforcing flange at the front thereof, a horizontally disposed groove at the bottom of the forward end thereof, and a front plate removably secured to the front reenforcing flanges of said side plates.

HENRY G. W. YOUNG.